United States Patent
Maguire

(10) Patent No.: US 9,454,681 B2
(45) Date of Patent: Sep. 27, 2016

(54) METHODS AND DEVICES FOR IDENTIFYING SELECTED OBJECTS

(75) Inventor: Yael Maguire, Somerville, MA (US)

(73) Assignee: PLUM LABS, LLC, Somerville, MA (US)

(*) Notice: Subject to any disclaimer, the term of this patent is extended or adjusted under 35 U.S.C. 154(b) by 443 days.

(21) Appl. No.: 13/118,710

(22) Filed: May 31, 2011

(65) Prior Publication Data

US 2012/0309454 A1 Dec. 6, 2012

Related U.S. Application Data

(60) Provisional application No. 61/491,375, filed on May 31, 2011, provisional application No. 61/491,380, filed on May 31, 2011.

(51) Int. Cl.
*G06K 7/10* (2006.01)
(52) U.S. Cl.
CPC .................. *G06K 7/10039* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,669,089 | B2* | 12/2003 | Cybulski et al. | 235/385 |
| 2001/0050922 | A1* | 12/2001 | Tiernay et al. | 370/467 |
| 2005/0099269 | A1* | 5/2005 | Diorio et al. | 340/10.51 |
| 2008/0143482 | A1* | 6/2008 | Shoarinejad et al. | 340/10.1 |
| 2008/0284600 | A1* | 11/2008 | Drzaic et al. | 340/572.1 |
| 2009/0207024 | A1* | 8/2009 | Schatz et al. | 340/572.1 |
| 2009/0212921 | A1* | 8/2009 | Wild et al. | 340/10.5 |
| 2010/0123559 | A1* | 5/2010 | Wilkinson | G06K 7/0008 340/10.4 |
| 2010/0188211 | A1* | 7/2010 | Brommer et al. | 340/539.32 |
| 2010/0295663 | A1* | 11/2010 | Shoarinejad | H04W 52/288 340/10.1 |
| 2011/0102149 | A1* | 5/2011 | Lin | G06F 3/012 340/10.1 |
| 2011/0254664 | A1* | 10/2011 | Sadr | H04Q 9/00 340/10.1 |

* cited by examiner

*Primary Examiner* — Fekadeselassie Girma
*Assistant Examiner* — Cal Eustaquio
(74) *Attorney, Agent, or Firm* — Lando & Anastasi, LLP

(57) ABSTRACT

A method of choosing an object from multiple objects using a wireless device includes receiving a backscatter communication signal from each of the objects, determining one or more analog parameter of each backscatter communication signal, and, using the wireless device, selecting one object based at least in part on the analog parameter of each backscatter communication signal. Each of the objects includes an RF interface configured to communicate using backscatter communication.

28 Claims, 15 Drawing Sheets

METHODS AND DEVICES FOR IDENTIFYING SELECTED OBJECTS

CROSS REFERENCE TO RELATED APPLICATIONS

This application is related to Provisional Application Ser. No. 61/491,375 entitled "Broadband Detector to Speed Up Data Transfer Between Devices" by Yael Maguire and Provisional Application Ser. No. 61/491,380 entitled "Array of Switchable Antenna Elements to Minimize Path Loss to RFID Tags from a Mobile Device" by Yael Maguire, both of which are filed concurrently herewith and are incorporated herein by reference in their entirety.

BACKGROUND

Wireless devices can transfer data via infrared communication ports or with radiofrequency (RF) data transfer. Microwave technologies such as Bluetooth and WiFi allow non-line-of-sight device-to-device communication. However, due to security concerns, these technologies require a set-up process in which a device must be added to the network. Although near-field-communication (NFC) can be used to exchange data between devices without adding a device to network, it functions only at a distance of ten centimeters or less.

Modern wireless devices have a large range and therefore may be in contact with many other wireless devices at any particular time. Thus, if a device is seeking to transfer data to or from another device, it may have a large number of devices from which to select the desired wireless device. Additionally, there is the possibility that another device within range may interfere with, or breach the security of, a particular wireless device. To minimize the potential for a security breach, one method of exchanging data is synchronization of the interaction, in which the users of two or more devices press a button to open a small security hole for a short window of time and exchange security keys. Some existing mobile devices can exchange accelerometer signals recorded when users bump their phones together. The exchange of accelerometer signals allows the devices to then exchange information.

SUMMARY

According to one aspect, a gestural interface technology for pairing two or more wireless devices or objects is provided. According to another aspect, a technology for wirelessly selecting objects is provided.

According to one embodiment, a method of choosing an object from multiple objects using a wireless device includes receiving a backscatter communication signal from each of the objects, determining one or more analog parameters of each backscatter communication signal, and, using the wireless device, selecting one object based at least in part on one or more of the analog parameters of each backscatter communication signal. According to one feature, each of the objects includes an RF interface configured to communicate using backscatter communication.

According to one embodiment, the method includes generating an RF signal using the wireless device. Receiving a backscatter communication signal from each of the objects may include receiving the backscatter communication signal from each of the objects by the wireless device. The method may also include detecting movement of the wireless device. Selecting one object of the multiple objects may include selecting one object based on the movement of the wireless device.

According to another embodiment, the method includes displaying a list of identifiers for a subset of the objects on a display of the wireless device. The method may also include generating the list of identifiers based on one or more of the analog parameters of each of the plurality of signals.

According to one embodiment, selecting one object includes receiving from a user of the wireless device an indication of a selection of a selected one of the objects from the list of identifiers. After selecting one of the object, the method may include communicating with the selected object using the wireless device.

According to one embodiment, the method includes detecting movement of one or more objects, and determining one or more additional parameters for each moving object. Selecting includes selecting one of the objects based at least in part on an analog parameter of each backscatter communication signal and based on an additional parameter for each moving object. According to one embodiment, one or more of the analog parameters is based on signal amplitude. In another embodiment, one or more of the analog parameters is based on signal phase.

According to another embodiment, the act of receiving includes receiving the backscatter signals at a stationary device, and the method includes forwarding information related to the backscatter signals from the stationary device to the wireless device.

According to one aspect, a wireless mobile device used for choosing an object from multiple objects includes an RF interface and a processing unit. The RF interface is configured to generate an RF signal and to receive backscatter signals related to the RF signal. The processing unit is coupled to the RF interface and configured to receive multiple backscatter signals from multiple objects, determine an analog parameter for each of the backscatter signals, and select a selected object based at least in part on the analog parameter for each of the backscatter signals.

According to one embodiment, the wireless mobile device includes one or more motion sensors coupled to the processing unit. The processing unit may be further configured to receive one or more motion signals from the motion detector and select the selected object based at least in part on the one or more motion signal. The wireless mobile device may include a display coupled to the processing unit, and the processing unit may be configured to generate on the display a list of identifiers for a subset of the objects on a display of the wireless device. The processing unit may be configured to generate the list of identifiers based on the analog parameter of each of the backscatter signals.

According to one embodiment, the wireless device includes a user interface coupled to the processing unit, and the processing unit is configured to select the selected object based on a signal from the user interface. The processing unit may be configured to communicate with the selected one of the objects through the RF interface after selecting the selected one of the objects. In one embodiment, one or more of the analog parameters is based on signal amplitude. In another embodiment, one or more of the analog parameters is based on signal phase.

According to one embodiment, the processing unit is configured to detect movement of at least one of the objects based on the backscatter signals, and determine one or more additional parameters for each moving object. The processing unit may be configured to select the selected object based at least in part on one or more analog parameters of each backscatter communication signal and based on one or more additional parameter for each moving object. According to one embodiment, the wireless mobile device is configured to operate as a cellular phone.

According to one aspect, the system includes multiple objects, each having an RF identification tag, a mobile device including an RF interface, and a processing unit coupled to the RF interface. The RF interface of the mobile device is configured to generate an RF signal and to receive backscatter signals related to the RF signal from each of the objects. The processing unit is configured to receive multiple backscatter signals from the objects, determine an analog parameter for each of the backscatter signals, and select a selected object from the objects based at least in part on the analog parameter for each of the backscatter signals.

According to one embodiment, the mobile device further includes at least one motion sensor coupled to the processing unit. According to one feature, the processing unit is further configured to receive one or more motion signals from the motion detector and select the selected object based at least in part on one or more motion signals.

According to one embodiment, the system includes a display coupled to the processing unit, and the processing unit is configured to display on the display identifiers for a subset of the objects on a display of the wireless device. The processing unit may be further configured to generate a list of the identifiers based on the analog parameter of each of the backscatter signals. The system may also include a user interface coupled to the processing unit, and the processing unit may be configured to select the selected object based on a signal from the user interface.

According to another embodiment, the processing unit is further configured to communicate with the selected one of the objects through the RF interface after selecting the selected one of the objects. In one embodiment, one or more of the analog parameters is based on signal amplitude. The processing unit may be further configured to detect movement of at least one of the objects based on the backscatter signals, and determine one or more additional parameters for each moving object. The processing unit may be configured to select the selected object based at least in part on one or more of the analog parameters of each backscatter communication signal and based on one or more of the additional parameters for each moving object. In another embodiment, one or more of the analog parameters is based on signal phase. According to one embodiment, the device is configured to operate as a cellular phone.

BRIEF DESCRIPTION OF THE FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
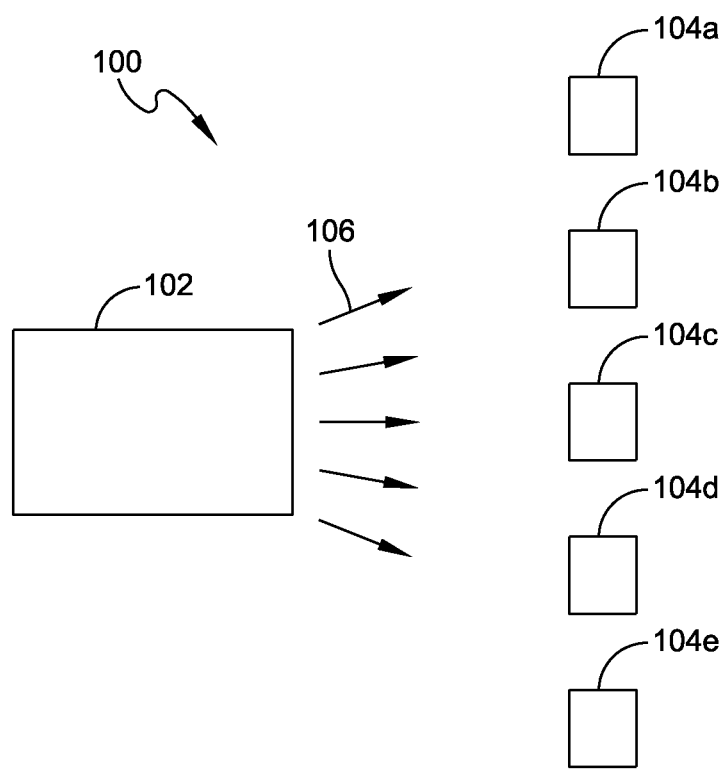
FIG. 1A is a diagram of a moveable reader and multiple stationary objects in accordance with aspects of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

At least some embodiments of the invention provide gestural interface technology for pairing two or more wireless devices or objects. In one example, one of the devices includes a radiofrequency (RF) reader and it determines which of several objects a user has selected. The RF reader may be stationary or it may be moveable. The wireless devices in different examples include audio music players, remote controls, digital media receivers (such as Apple's "Apple TV" MC572LL/A), stationary readers, RF readers, wireless communication devices such as mobile telephones, smart phones, and personal digital assistants, and computer systems, including desktops, laptops and tablet computers. A wireless mobile device in different examples include audio music players, remote controls, digital media receivers (such as Apple's "Apple TV" MC572LL/A), stationary readers, RF readers, wireless communication devices such as mobile telephones, smart phones, and personal digital assistants, and computer systems, including laptops and tablet computers. The identified objects in various examples include RF tags, and may be business cards, coupons, media tags, audio music players, remote controls, digital media receivers, wireless communication devices such as mobile telephones, smart phones, and personal digital assistants, computer systems, including desktops, laptops and tablet computers, and consumer goods, including clothing, food products, posters, advertisements, and media including books and CDs.

FIG. 1A is a diagram 100 of a moveable reader 102 and multiple stationary objects 104a-104e, according to an embodiment of the invention. The reader 102 transmits a signal to identify the particular stationary objects 104a-104e. The signal may be an RF signal, and the objects 104a-104e may include RF tags. The reader 102 uses another measurement technique to determine which of the stationary objects 104a-104e is within its manipulatory space. The reader 102 may then determine which of the objects 104a-104e within the manipulatory space the user of the reader 102 is selecting. Manipulatory space is generally the area within an arms-length of an individual. In various examples, it may include the space within about two feet of the reader 102, within about three feet of the reader 102, within about four feet of the reader 102, within about five feet of the reader 102, or within about one meter of the reader 102.

In different embodiments, there are various techniques the reader 102 may use to determine which of the stationary objects 104a-104e is within its manipulatory space. In one embodiment, the reader 102 uses a Receive Signal Strength Indicator (RSSI) technique. RSSI provides a measurement of the power of the received signal from each of the objects 104a-104e. According to one feature, RSSI is sufficient to determine if an object 104a-104e is within the manipulatory space of the reader 102 if the amplitude threshold between manipulatory space and ambulatory space is higher than the maximum scattered or diffracted amplitude within an environment. Ambulatory space is the area beyond the manipulatory space. In one embodiment, both the reader 102 and one or more of the stationary objects 104a-104e include readers and the reader 102 and one or more of the stationary objects 104a-104e share information. In this embodiment, the reader 102 and the stationary objects 104a-104e may collaborate to determine which technique (or combination of techniques) to utilize in determining which of the objects 104a-104e are in the manipulatory space. In another embodiment, all the objects 104a-104e are completely stationary, and changes in amplitude at a particular frequency are caused by environmental changes such as moving people, animals, or other moving objects.

According to another embodiment, the reader 102 uses phase information of received signals to determine which of the stationary objects 104a-104e is within its manipulatory space. The reader 102 may use phase information from multiple frequencies, and may use one or more frequency hops. In one example, the reader 102 transmits a primary carrier signal and a subcarrier frequency, receives backscatter signals from each of the devices, and derives the phase information from the subcarrier frequency in the backscatter signals. According to one feature, the power of the subcarrier frequency is selected such that it is less than the power of the primary carrier signal and does not interfere with the primary carrier signal.

According to another embodiment, the reader 102 uses the angle of arrival of the signals to determine which of the stationary objects 104a-104e is within its manipulatory space and is being selected. The angle of arrival may be determined based on the arrival of the signal at two or more antennas located at the reader 102. According to various embodiments, the reader 102 may have any selected number of antennas. In one example, the reader 102 has at least two antennas, and the antennas are positioned on the reader to maximize or to nearly maximize the distance between them.

According to another embodiment, the reader 102 uses a time of flight measurement to determine which of the stationary objects 104a-104e is within its manipulatory space and is being selected. According to one feature, a time of flight measurement may be most accurate when the reader 102 is communicating with devices that include high speed processing.

According to one embodiment, the reader 102 exchanges information with the stationary objects 104a-104e over a broadband incoherent ASK modulation channel. According to one feature, a broadband channel permits the reader 102 to communicate with nearby objects 104a-104e in parallel with other types of communications. According to another feature, a broadband channel permits the reader 102 to begin communicating with the objects 104a-104e immediately, without waiting for a security code or password. According to one embodiment, the reader 102 uses a broadband channel to determine which of objects 104a-104e is in its manipulatory space.

According to one embodiment, the reader 102 determines which of the objects 104a-104e the user of the reader 102 is selecting based on the movement of the reader 102. According to one feature, because the objects 104a-104e are stationary, any change in the path of a signal transmitted by the reader 102 will be caused by movement of the reader 102. The reader 102 may include inertial sensors, such as one or more of an accelerometer, a gyroscope, and a magnetometer. The reader 102 may use information from the inertial sensors, in addition to information from the backscattered signals, to estimate the motion of the reader 102 relative to the objects 104a-104e. In one example, the reader 102 is moved in a circular path around a selected object (one of the objects 104a-104e), and information from the reader's 102 inertial sensors indicates this movement. The reader 102 calculates which object 104a-104e the circular movement is most centered on and thereby determines which object 104a-104e is most likely being selected by the user. According to one embodiment, the reader 102 includes one or more filters matched to a specific gesture (e.g., circling the reader 102 around a selected object, moving the reader 102 back and forth toward a selected object thereby pointing to the selected object). A reader 102 including one or more matched filters may obtain a higher signal to noise ratio in its selection of an object 104a-104e.

According to one embodiment, the reader 102 uses a statistical distribution to determine which of the objects 104a-104e is being selected. In one example, a user moves the reader 102 rotationally around the selected object. In this example, the selected object is centered at 0 and the reader 102 is moved rotationally around it with an average radius r, such that on average $P=\sqrt{r^2+z^2}$, where p is the distance from the antenna of the reader 102 to the RFID tag of the object, z is the height from surface of the RFID tag to the reader 102 as shown in FIG. 1D. In one example, the probability that a reader follows a path at a radius r and a height z may be determined using Equation 1.

$$\rho(r, z, \theta) = \frac{1}{(2\pi)^{\frac{3}{2}} \sigma_r^2 \sqrt{\sigma_z^2}} e^{-\frac{r^2}{2\sigma_r^2} - \frac{(z-\mu_z)^2}{2\sigma_z^2}} = \rho(r, z) \quad (1)$$

where ρ is a probability density function (PDF) and r, z, and θ are cylindrical coordinates. The probability density function indicates the probability that a path of the user is at a position r, z, θ in 3D space (cylindrical coordinates). Equation 1 is a Gaussian distribution in cylindrical coordinates.

In another example, the probability density function may be determined using Equation 2.

$$\rho(r, z, \theta) = \frac{1}{2\pi\sigma_r^2} e^{-\frac{r^2}{2\sigma^2}} \delta(z - \mu_z) = \rho(r, z) \quad (2)$$

Equation 2 is a PDF similar to Equation 1, except in Equation 2, the height of the reader 102 is constrained at height $\mu_z$. Equation 1 allows the reader 102 to be at a variety of heights with an overall average height $\mu_z$.

The reader 102 will make a calculation based on the mean of a function $f\{1,2\}=f(A_0), f(\phi_0)$. $A_0$ represents the amplitude and $\phi_0$ represents the phase. Thus, the reader 102 calculates two functions: function $f(A_0)$ is a function of the amplitude and function $f(\phi_0)$ is a function of the phase. In one example, the amplitude and phase are treated as random variables, and the average values of the amplitude and phase over the PDF are used to calculate an expectation of the function $f_m$. In one example, the mean of the function $M_{f_m}$ may be determined using Equation 3.

$$E[f_m(p(x_0))] = \int_V f_m(p(x_0))\rho(r, z)\,dV \quad (3)$$
$$= M_{f_m}(x_0)$$
$$\approx \sum_l^N f_m(p_l)/N$$

where $x_0$ is the x coordinate of the tag relative to the center of the circle traced by the reader. According to one feature, the reader 102 attempts to maximize or minimize Equation 3 with respect to $x_0$, for example using Equation 4.

$$\left.\frac{\partial M_{f_m}}{\partial x_0}\right|_{x_0=0} = 0 \forall r, z \text{ and } \left.\frac{\partial^2 M_{f_m}}{\partial x_0^2}\right|_{x_0=0} \neq 0 \forall r, z \quad (4)$$

If the function is maximized, the first derivative will be zero at $x_0$, and the second derivative will be negative at $x_0$. If the function is minimized, the second derivative will be positive at $x_0$. According to one feature, the equations show that the tag that is closest to the center of the rotationally invariant path traced by the reader 102 (the closest tag) will produce the extremal value of the expectation of the function $f$. The reader will choose the closest tag based on calculating the expectation of a function $f$. Equation 4 may be further defined by Equation 5.

$$\left.\frac{\partial M_{f_m}}{\partial x_0}\right|_{x_0=0} = \int_V \frac{\partial f_m}{\partial p}\frac{\partial p}{\partial x_0}\rho(r, z)r\partial r\partial\theta\partial z\bigg|_{x_0=0} \quad (5)$$

In one example, the evaluation function $f_1$ results in the closest tag producing an extremal expectation. The evaluation function $f_1$ may be determined using equation 6.

$$f_1 = \log A_0 = 2 \log(C(\omega)/p) \quad (6)$$

where $C(\omega)$ is a constant and its value is a function of the wavelength, the gain of the antenna(s), the power transmitted, and selected characteristics of the receiver. According to one feature, power decays as $r^2$, and $f_1$ is the response from the RF tags in each object 104a-104e as a function of the distance of the object 104a-104e from the reader 102. According to another feature, $f_1$ is estimated from the natural logarithm of the raw backscattered amplitude $A_0$ from the signals received by the reader 102 from a tag in each of the objects 104a-104e.

The evaluation function $f_2$ results in the closest tag producing an extremal expectation. The evaluation function $f_2$ may be determined using Equation 7.

$$f_2 = \left(\frac{\partial}{\partial t}\Phi_0(t)\right)^2 = \left(\frac{\partial}{\partial t}\text{mod}\left(\frac{2\omega}{c}p(\theta(t)) + \phi_\omega\right)\right)^2 \quad (7)$$

where ω is the frequency of the radio frequency wave, c is the speed of light, θ is a cylindrical coordinate (as defined above with respect to Equation (1), $\Phi_\omega$ is the phase offset of the backscatter signal through the receiver chain and the initial phase of the tag. According to one feature, $f_2$ is the square of the derivative of the phase signal, and the phase signal is estimated by the reader 102 from the raw backscattered phase of the signals received by the reader 102 from a tag in one of the objects 104a-104e. The expectation of $f_1$ may be differentiated to maximize the function. According to one feature, the second differentiation of $f_1$ may be used to ensure that the estimated value of $f_1$ is extremal and negative. The first and second order differentiation of $f_1$ may be calculated using Equation 8 and Equation 9.

$$\left.\frac{\partial M_{f_1}}{\partial x_0}\right|_{x_0=0} = \int_V \frac{2r\cos\theta}{r^2+z^2}\rho(r, z)r\partial r\partial\theta\partial z = 0 \quad (8)$$

$$\left.\frac{\partial^2 M_{f_1}}{\partial x_0^2}\right|_{x_0=0} = \int_{r,z} \frac{-4\pi z^2}{(r^2+z^2)^2}\rho(r, z)r\partial r\partial z < 0 \text{ for } E[z] = \mu_z \neq 0 \quad (9)$$

Similarly, the expectation of $f_2$ may be differentiated to minimize the function. According to one feature, the second differentiation of $f_2$ may be used to ensure that the estimated value of $f_2$ is extremal. The differentiation of $$f_2 = \Phi_0(t) = \text{mod}\left(\frac{2\omega}{c}p(\theta(t)) + \phi_\omega\right)$$

or the raw phase signal, may be calculated using Equation 10 and Equation 11.

$$\left.\frac{\partial M_{f_2}}{\partial x_0}\right|_{x_0=0} = \int_V \frac{-2\omega r\cos\theta \text{mod}^{(1,0)}\left(\sqrt{r^2+z^2}, 2\pi\right)}{c\sqrt{r^2+z^2}}\rho(r, z)r\partial r\partial\theta\partial z \quad (10)$$
$$= 0$$

-continued $$\left.\frac{\partial^2 M_{f_2}}{\partial x_0^2}\right|_{x_0=0} = \int_V \frac{2\omega \text{mod}^{(1,0)}\left(\sqrt{r^2+z^2}, 2\pi\right)}{c\sqrt{r^2+z^2}} - \qquad (11)$$

$$\frac{2r^2\omega\cos(\theta)^2\text{mod}^{(1,0)}\left(\sqrt{r^2+z^2}, 2\pi\right)}{c(r^2+z^2)^{3/2}} +$$

$$\frac{4r^2\omega^2\cos\theta^2\text{mod}^{(2,0)}\left(\sqrt{r^2+z^2}, 2\pi\right)}{c(r^2+z^2)}\right)\rho(r,z)r\partial r\partial\theta\partial z$$

The integral of Equation 11 can change sign depending on the value of r or z, and therefore does not guarantee that the extremal point $x_0$ will be minimized. The square of the derivative with respect tot and thus θ may be used if the angle changes linearly over time. A global minimum may be calculated using Equations 12 and 13 from Equation 7.

$$\left.\frac{\partial M_{f_2}}{\partial x_0}\right|_{x_0=0} = 0 \qquad (12)$$

$$\left.\frac{\partial^2 M_{f_2}}{\partial x_0^2}\right|_{x_0=0} = \qquad (13)$$

$$\int_{r,z} \frac{16\pi^2 r^2 f\omega^2 \text{mod}^{(1,0)}\left(\sqrt{r^2+z^2}, 2\pi\right)^2}{c^2(r^2+z^2)}\rho(r,z)r\partial r\partial z > 0 \forall r, z$$

According to one feature, a second derivative provides assurance that the result of the first derivative (Equation 12) is the minimum value and not the maximum value. According to one embodiment, the algorithm will ensure that the result is the maximum value over all r and z. According to one feature, r and z may have any value according to the usage of the reader 102, and the reader 102 will select the tag that is located closest to the center of the reader's rotationally invariant path according to the algorithm. For example, r may be about 2 cm, about 5 cm, about 10 cm, about 15 cm, about 20 cm, about 25 cm, about 50 cm, about 75 cm, about 1 m, about 1.5 m, about 2 m, or about 3 m. In another example, z may be about 2 cm, about 5 cm, about 7 cm, about 10 cm, about 12 cm, about 15 cm, about 20 cm, about 25 cm, about 30 cm, about 40 cm, about 50 cm, about 75 cm, about 1 m, about 2 m, about 3 m, about 4 m or about 5 m. According to another feature, the results show that as long as the reader 102 is moved in a rotationally invariant manner (i.e., in circles), the $f_1$ and $f_2$ functions are optimal (i.e., the reader 102 will use the fewest number of estimation steps to find the closest tag). According to one feature, $f_1$ is a monotonic function and $f_1$ may be used to sort the tags identified by the reader 102. $f_1$ may be used to sort the tags by their distance from the center of the path taken by the reader.

Using evaluation function $f_1$, the maximum $f_1$ for any tag is the tag which should be selected as being closest to the reader 102. Using evaluation function $f_2$, the minimum $f_2$ calculated for any tag is the tag that should be selected as being closest to the reader 102.

Figure 1B:
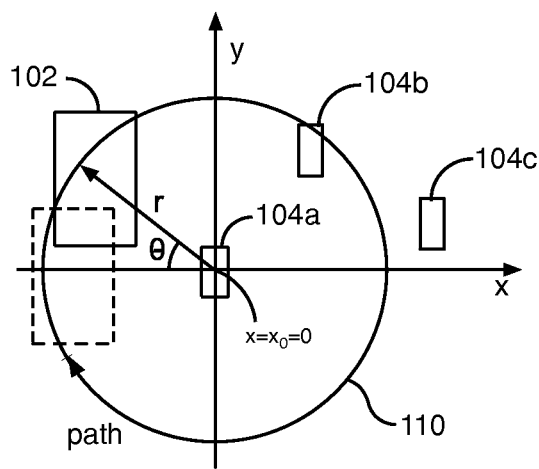
FIG. 1B is a schematic diagram showing a reader moving in a circular pattern around an object in accordance with aspects of the present invention.

FIG. 1B is a schematic showing the reader 102 moving in a circle 110 around the object 104a, indicating a user's selection of object 104a, according to an embodiment of the invention. The reader 102 may calculate the estimation function $f_1$ from the amplitude of the backscattered signal. The reader 102 may calculate the estimation function $f_2$ from the phase of the backscattered signal. The amplitude and phase of the backscattered signal are functions of the distance r from the object 104a as described above, where r is also the radius of the circle 110. The amplitude and phase are functions of the angle θ with respect to the object 104a, as described above. The reader 102 may also calculate the estimation function $f_1$ or the estimation function $f_2$ for the other objects 104b-104e. Because the reader 102 is following a circular path 110 around the object 104a, multiple calculations of these measurements and their use in the equations described above will allow the reader to determine with high probability that the object being selected is object 104a.

Figure 1C:
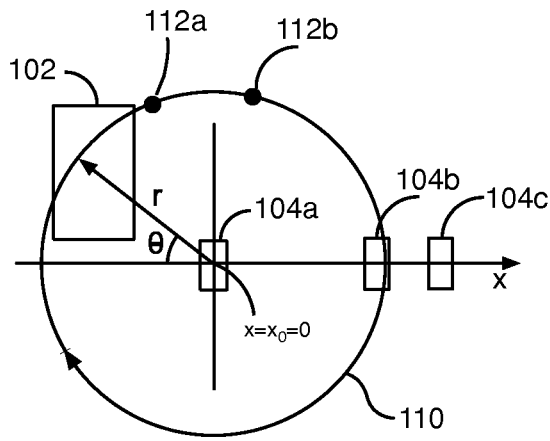
FIG. 1C is a schematic diagram showing a reader and multiple objects at various distances from the reader in accordance with aspects of the present invention.
Figure 1D:
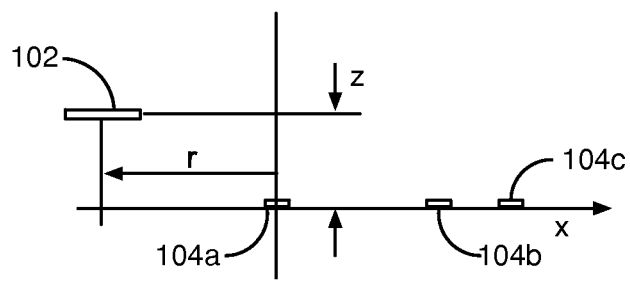
FIG. 1D is a sideview of a reader and multiple objects in accordance with aspects of the present invention.

FIG. 1C is a schematic showing the reader 102 and the objects 104a-104c and the respective distances of these objects from the reader 102 along the x-axis, according to an embodiment of the invention. According to one feature, the movement of the reader 102 is rotationally invariant, so a one-dimensional representation is sufficient to calculate the expectation (e.g., using only the x-axis coordinate) to identify the selected object. The reader uses the amplitude $A_1$ and phase $\phi_1$ of the received signal, as described above.

FIG. 1D is a sideview of the reader 102 and the objects 104a-104c, showing the vertical distance z between the reader 102 and the objects 104a-104c, according to an embodiment of the invention. According to one representation, the objects 104a-104c are all positioned on a flat surface, and the reader 102 is positioned a selected distance z above the flat surface, where it is moved rotationally around the selected object 104a.

Figure 2:
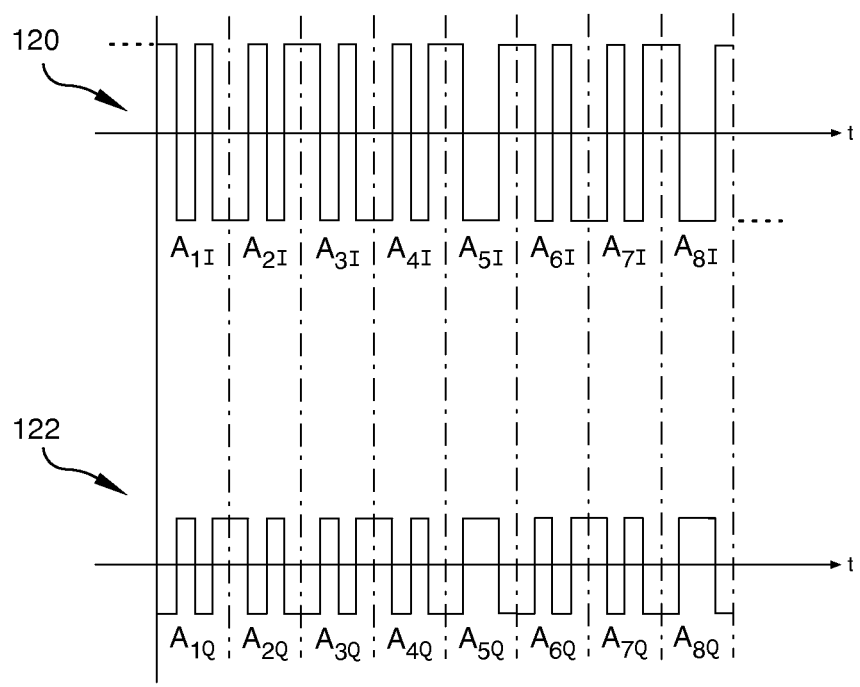
FIG. 2 is a diagram of an I signal and a Q signal over time as received by an RFID reader in accordance with aspects of the present invention.

FIG. 2 shows a portion of the I signal 120 and the Q signal 122 over time as received by an RFID reader after backscattering from RFID tags using a M=2 Miller modulation, according to an embodiment of the invention. As shown in FIG. 2, the I and Q signals 120,122 have different amplitudes and a different sign.

Figure 3A:
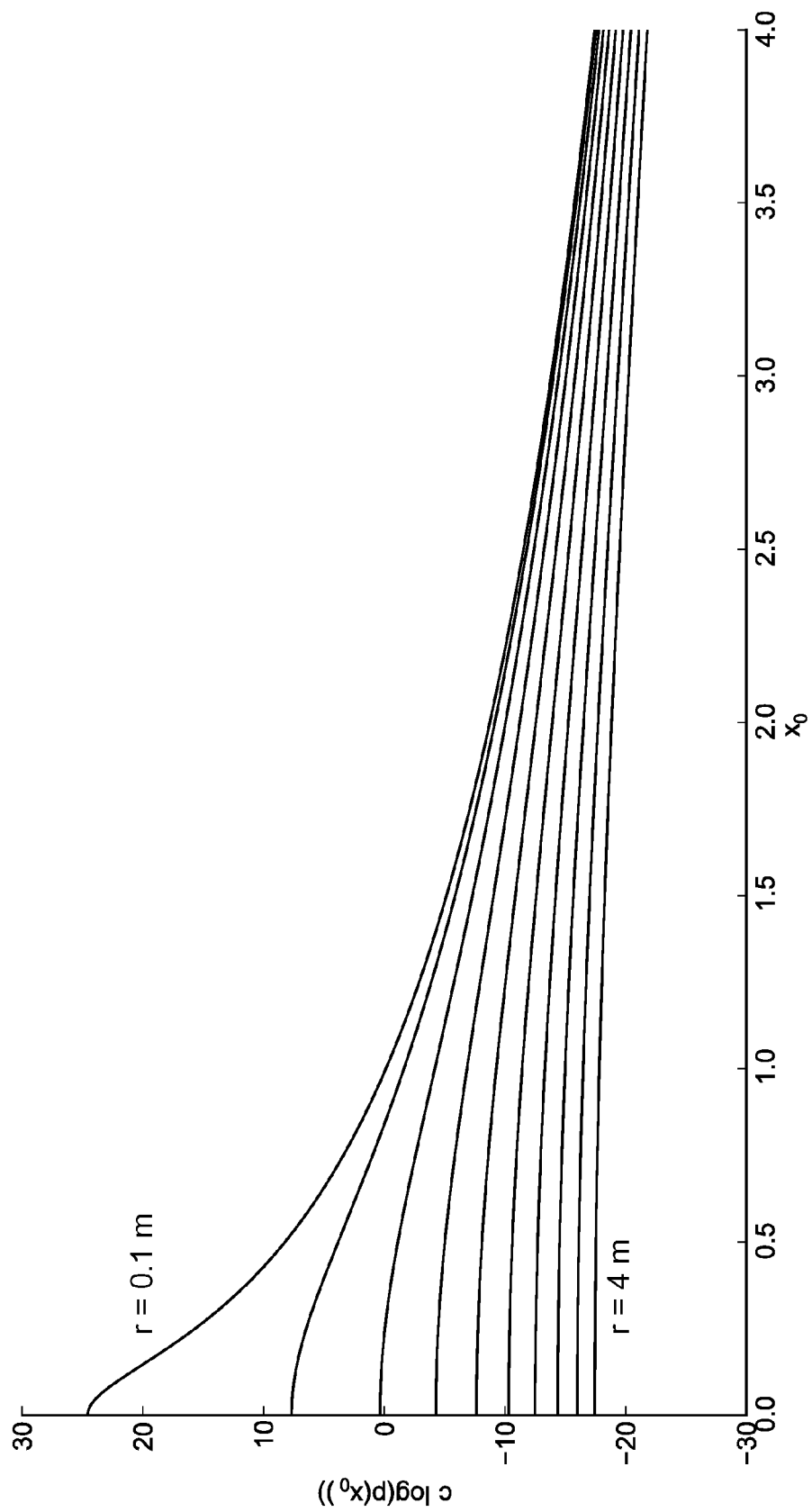
FIG. 3A is a graph showing several plots of a function $f_1$ in accordance with aspects of the present invention.

FIG. 3A shows several plots of the function $f_1$ (defined in Equation 6), for C(w)=1, z=0.1 and various values of r, ranging from r=0.1 m to r=4 m. The y-axis shows the result of the function $f_1$=2 log(C(ω)/p(χ)), and the x-axis shows different values of $x_0$. For each value of r, the functions of $f_1$ are extremal (maximal) at $x_0$=0.

Figure 3B:
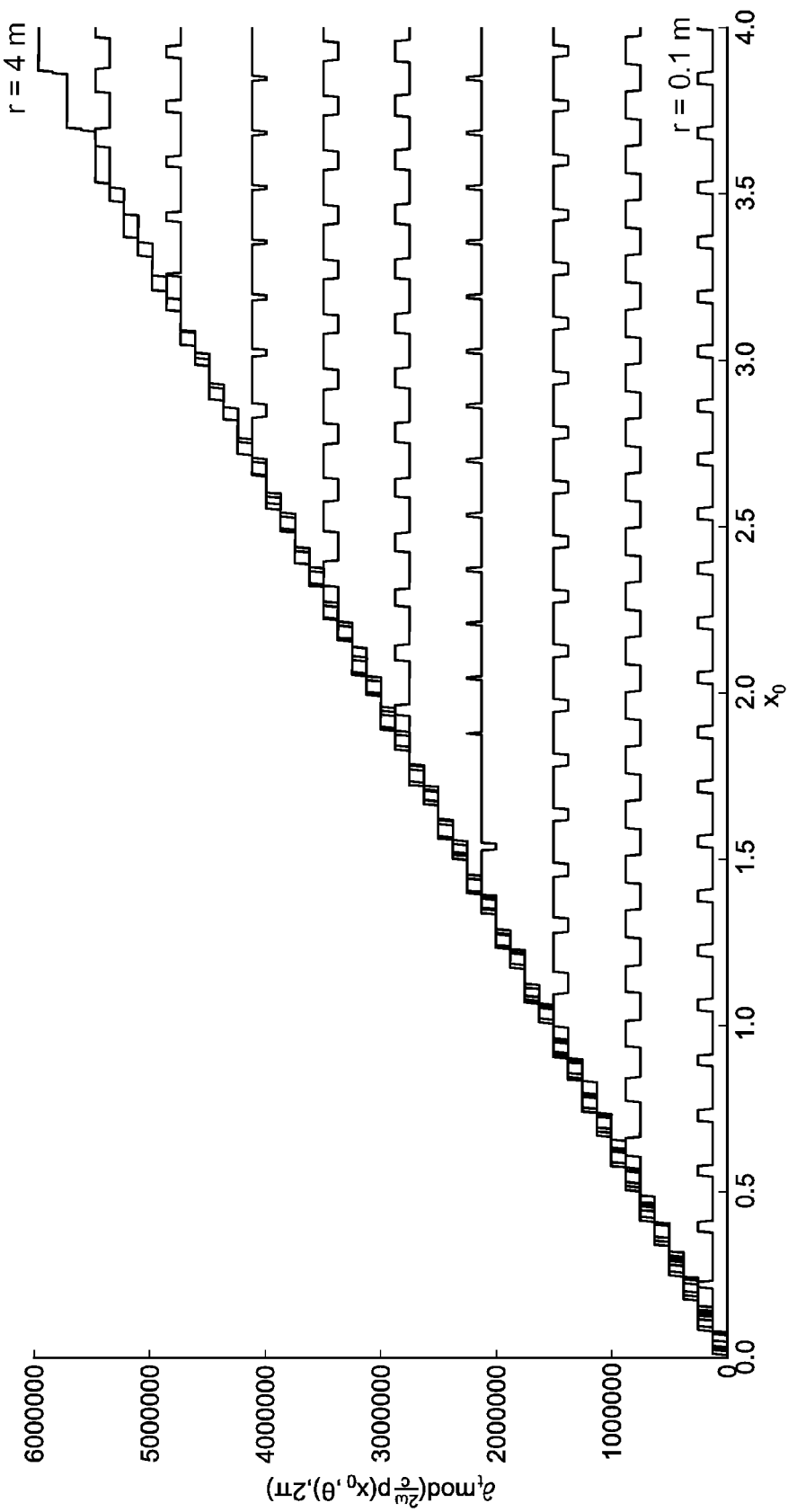
FIG. 3B is a graph showing several plots of a function $f_2$ in accordance with aspects of the present invention.

FIG. 3B shows several plots of the function $f_2$ (defined in Equation 7), for ω=2π915 MHz, z=0.1 and various values of r, ranging from r=0.1 m and r=4 m. The y-axis shows the result of the function $$f_2 = \left(\partial_t \text{mod}\left(\frac{2\omega}{c} p(x_0, \theta(t))\right)\right)^2,$$

and the x-axis shows different values of x. For each value of r it can be readily seen that the functions of $f_2$ are extremal (minimal) at $x_0$=0.

According to various examples, the reader 102 may be included in an audio music player, remote control, wireless communication device such as a telephone, smart phone, or personal digital assistant, or a computer system, including a laptop or tablet computer. In some examples, the objects 104a-104e may be audio music players, remote controls, business cards, coupons, media tags, digital media receivers, wireless communication devices such as telephones, smart phones, or personal digital assistants, or computer systems, including desktops, laptops or tablet computers.

Figure 4:
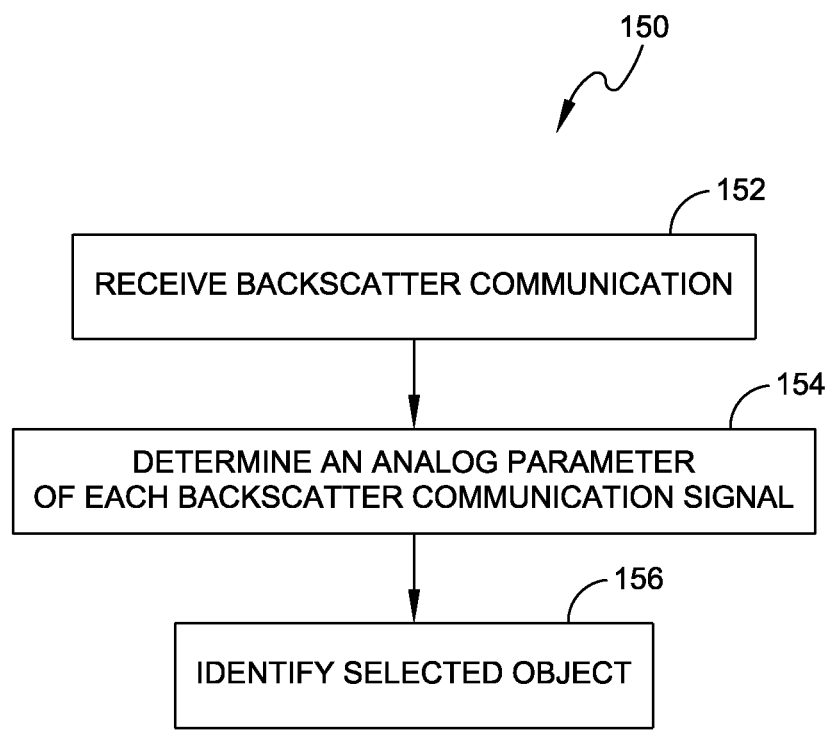
FIG. 4 is a flow chart of a method of identifying a selected object in accordance with aspects of the present invention.

FIG. 4 is a flow chart of a method 150 of identifying a selected object, according to an embodiment of the invention. At block 152, a reader, such as the reader 102 of FIG. 1, receives backscatter communication from local objects, such as the baseband backscatter signal shown in FIG. 2 from objects such as objects 104a-104e of FIG. 1. At block 154, the reader determines an analog parameter of each backscatter communication signal. For example, the reader may determine phase information, information about the angle of arrival of the signal, time-of-flight information, or RSSI amplitude. According to one feature, the reader uses the analog parameter of each backscatter communication signal to determine if the object which sent the backscatter communication signal is in the reader's manipulatory space. At block 156, the reader identifies a selected object. For example, the reader may identify the object that the user of the reader is attempting to select. In one embodiment, the reader creates a list of objects in its manipulatory space, and orders the list according to which objects it determines the user is most likely to be selecting, with the most likely selected object at the top of the list, and the least likely selected object at the bottom of the list. According to one feature, the reader creates a list that includes only objects that are in the reader's manipulatory space, and the list is ordered based on the parameters chosen in block 154.

Figure 5:
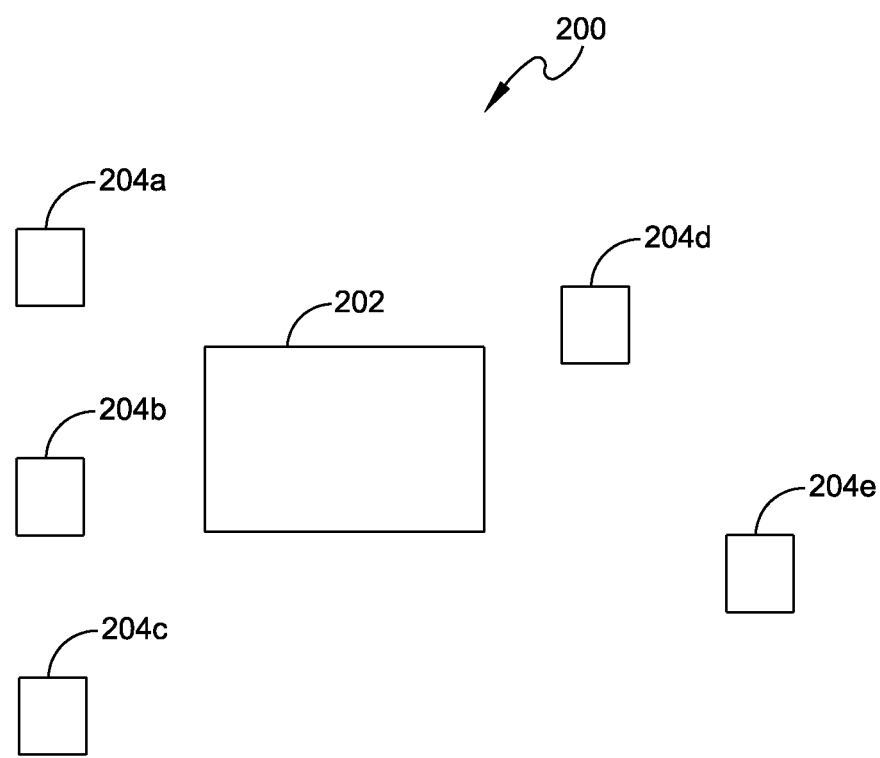
FIG. 5 is a diagram of a stationary reader and multiple moveable objects in accordance with aspects of the present invention.

FIG. 5 is a diagram 200 of a stationary reader 202 and multiple moveable objects 204a-204e, according to an embodiment of the invention. The reader 202 transmits a signal to identify the objects 204a-204e. For example, the reader 202 may transmit an RF signal and the objects 204a-204e may include an RF tag which the reader 202 uses to identify them. In one example, the moveable objects 204a-204e may also include RF readers. The reader 202 determines which of the objects 204a-204e are within its manipulatory space. The reader 202 may use one of the measurement techniques described above to determine which of the objects 204a-204e are within its manipulatory space. For example, if the object is rotationally moved around the stationary reader, the reader may use information about the received signal to determine the closest tag as described above with respect to FIG. 1A. In another example, the reader uses the time-varying phase and amplitude information to determine which tag the user intends to select. For example, the reader 202 may use RSSI, phase information, angle of arrival information, time-of-flight information. The reader may use path changes of the signal backscattered from the objects 204a-204e to determine which object is closest. However, since the reader 202 is stationary, the reader 202 does not use inertial sensors to estimate motion of the objects 204a-204e. In one example, the reader 202 uses proximity sensors to determine the approximate locations of the objects 204a-204e. In various examples, the proximity sensors may be one or more of a camera, an infrared LED and a photodiode. In another example, the reader 202 uses RADAR methods, as discussed below with respect to FIG. 13. According to one example, the objects 204a-204d are in the manipulatory space of the reader 202, while the object 204e is outside the reader's 202 manipulatory space.

Figure 6:
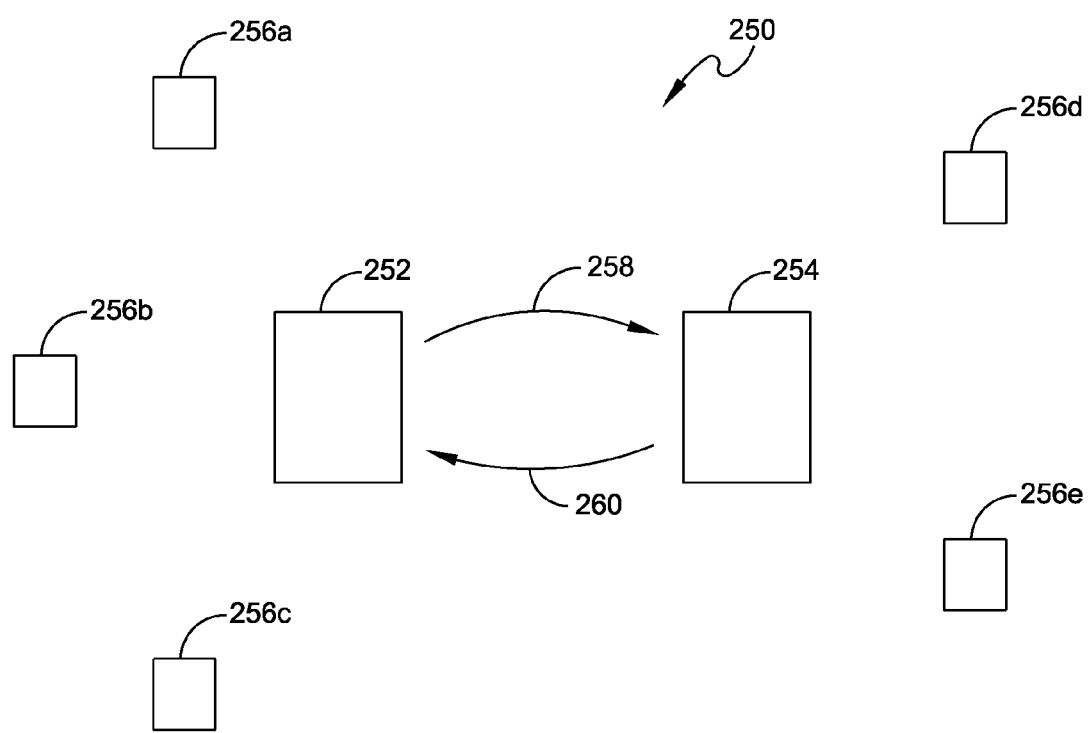
FIG. 6 is a diagram of multiple moveable readers in accordance with aspects of the present invention.

FIG. 6 is a diagram 250 of multiple moveable readers 252, 254, and 256a-256e, according to an embodiment of the invention. The first reader 252 and the second reader 254 are communicating with each other via first 258 and second 260 communication signals. According to one example, the readers 256a-256c and the second reader 254 are in the manipulatory space of the first reader 252, and the readers 256d and 256e and the first reader 252 are in the manipulatory space of the second reader 254. According to one feature, the first reader 252 received backscatter communication from the second reader 254 and the readers 256a-256c, determined at least one parameter of each backscatter communication signal, and selected the reader 254. Similarly, the second reader 254 received backscatter communication from the first reader 252 and the readers 256d and 256e, determined at least one parameter of each backscatter communication signal, and selected the reader 252.

Figure 7:
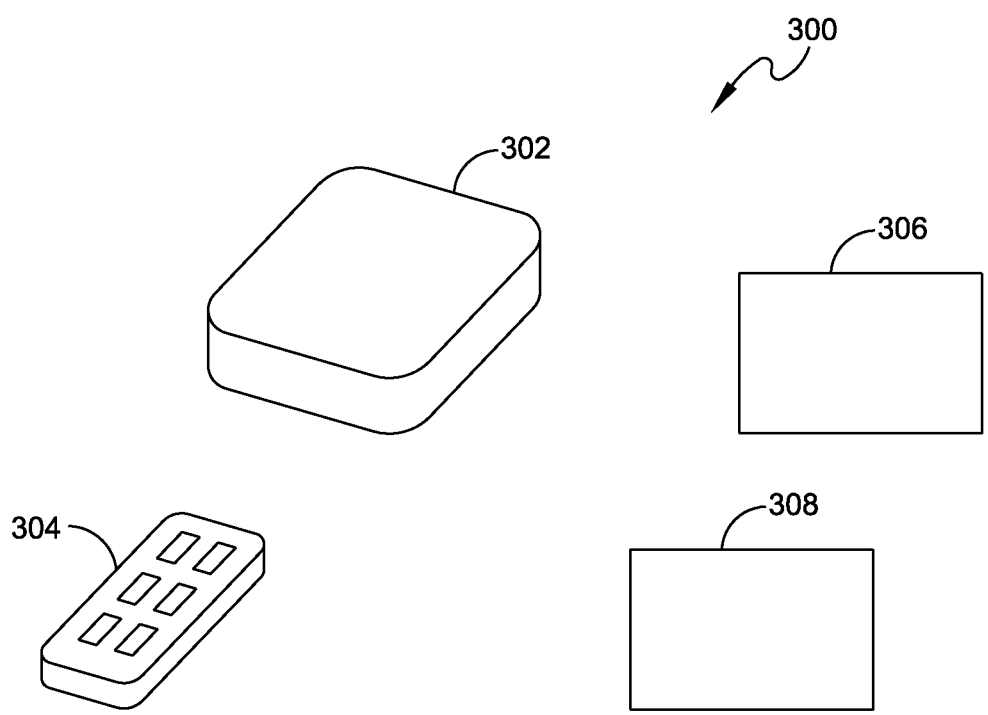
FIG. 7 is a diagram of a digital media receiver and multiple objects in accordance with aspects of the present invention.

FIG. 7 is a diagram 300 of a digital media receiver 302 and first 304, second 306 and third 308 objects, according to an embodiment of the invention. The digital media receiver 302 is an example of a stationary reader, such as the reader 202 of FIG. 3. The first 304, second 306 and third 308 objects are moveable objects, which may be moved by a user toward or around the digital media receiver 302 to indicate that a user wants to connect the object with the digital media receiver 302. In various examples, the objects 304, 306 and 308 may be audio music players, remote controls, wireless communication devices such as telephones, smart phones, and personal digital assistants, or computer systems, including desktops, laptops and tablet computers.

Figure 8:
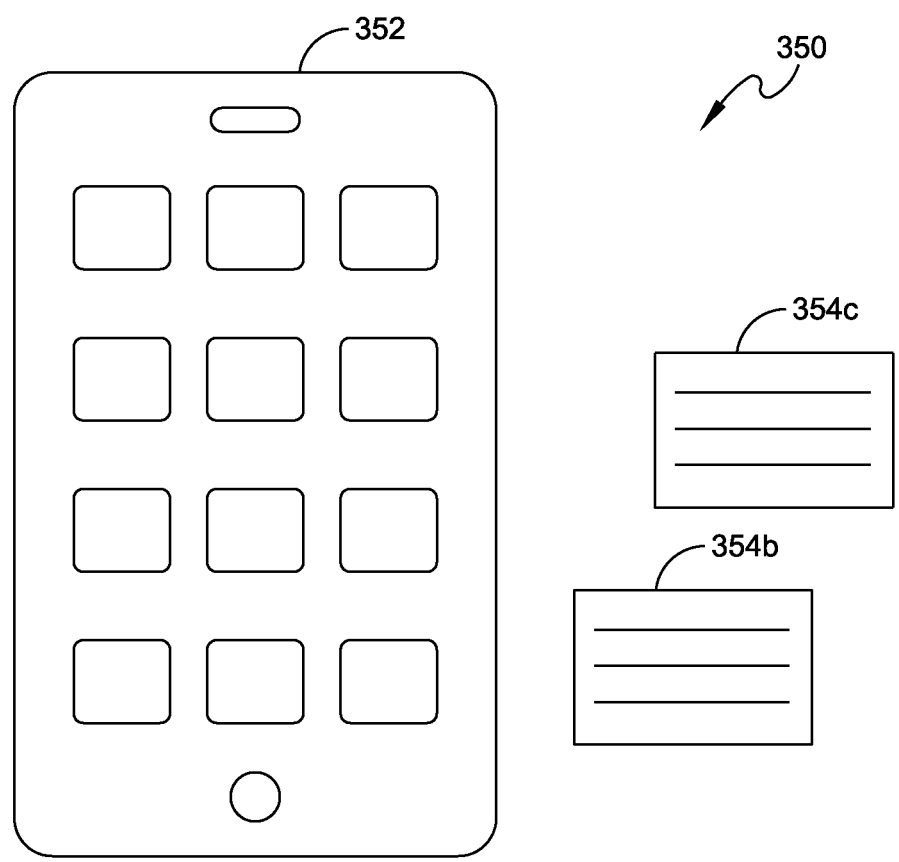
FIG. 8 is a diagram of a wireless device and multiple objects in accordance with aspects of the present invention.

FIG. 8 is a diagram 350 of a wireless communication device 352 and first 354a and second 354b stationary objects, according to an embodiment of the invention. The wireless communication device 352 includes a moveable reader, such as the reader 102 of FIG. 1. In one example, the wireless communication device 352 is a smart phone. The first 354a and second 354b objects may be business cards, coupons, or media tags. In one example, the user of the wireless communication device 352 moves the device 352 around over the object the user would like to select. For example, the first object 354a may be a coupon that the user would like to redeem, and the user may move the device 352 over the object 354a, and then move it approximately around the center of the object 354a while still hovering one to several inches above the object 354a. The user may use other motions to indicate which object the user wishes to select, and the device 352 may be programmed to recognize other movements as object selection. According to various examples, the device 252 hovers about two cm above the object 354a, about five cm above the object 354a, about ten cm above the object 354a, about twenty cm above the object 354a, between about five cm and about twenty cm above the object 354a, or between about ten cm and about twenty cm above the object 354a.

Figure 9:
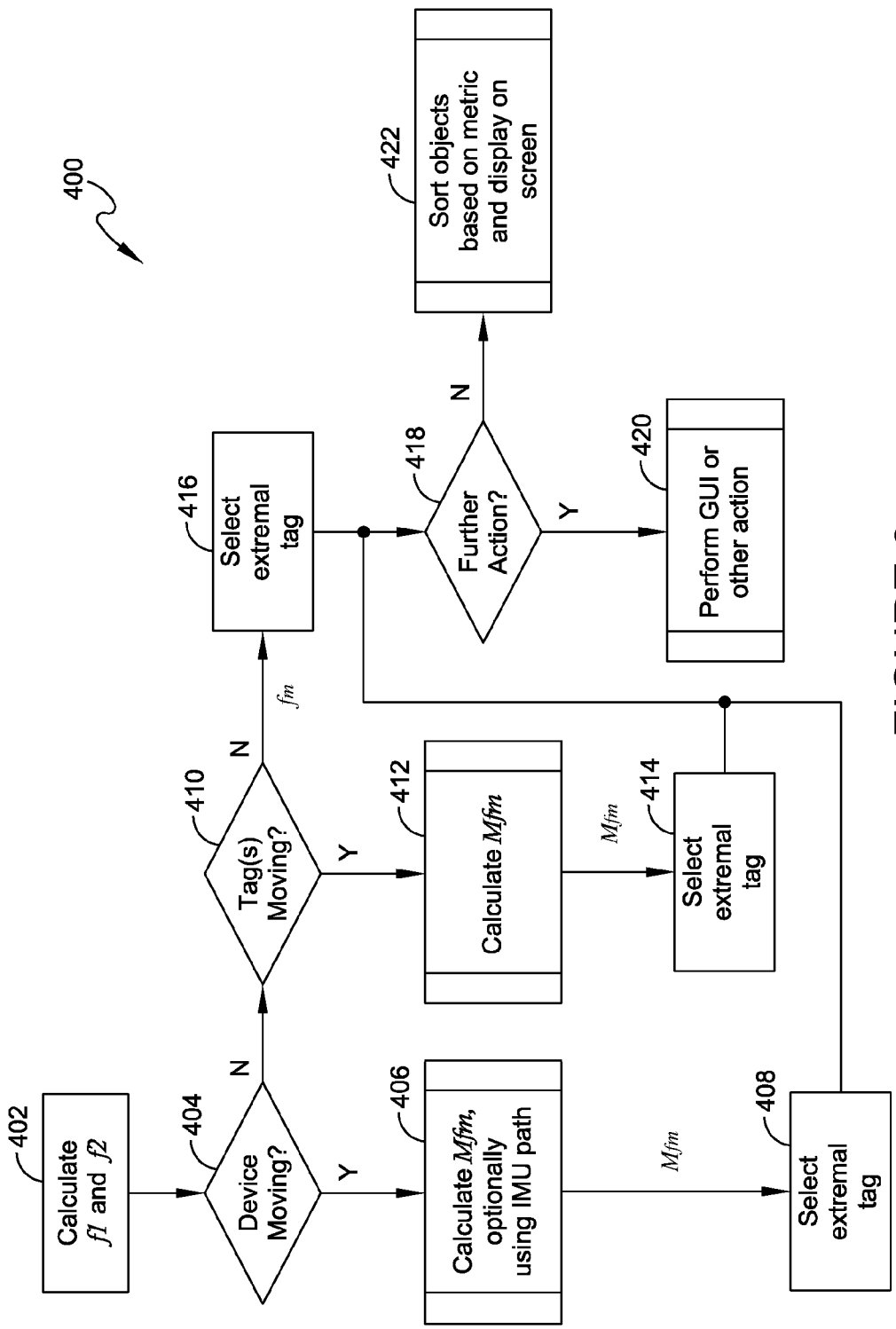
FIG. 9 is a flow chart of a method of identifying a selected object in accordance with aspects of the present invention.

FIG. 9 is a flow chart of a method 400 of sorting objects, according to one embodiment of the invention. In one example, the method 400 may be used by a reader to determine which object the user of the reader is selecting. At block 402, a device (such as reader 102 of FIG. 1) calculates $f_1$ and $f_2$, as described above with respect to FIG. 1. At block 404, the device determines if it is moving or stationary. If the device is moving, the method 400 proceeds to block 406, where the device calculates $M_{f_m}$, the expectation of the $f_m$ function, where m=1 or 2, as described above with respect to FIG. 1A. The device may use data from inertial sensors to calculate $M_{f_m}$. For example, the device may use data about the path of the inertial sensors in calculating $M_{f_m}$. At block 408, the device selects the extremal tag. According to one feature, the extremal tag is the tag the device determines is most likely being selected by a user. After selecting the extremal tag, at block 418 the device determines if it should perform another action. If there is a further action to be performed, at block 420 the device performs the next action or displays a graphical user interface allowing a user to select the next action. If no further action is needed, at block 422 the device sorts the objects based on a selected metric and displays the sorted list of objects on a screen, or any method of graphically indicating a priority list of objects.

Returning to block 404, if the device is not moving, the method 400 proceeds to block 410. At block 410, the device determines if one or more of the tags it identifies are moving. If one or more tags is moving, at block 412, the device calculates $M_{f_m}$, as described above with respect to FIG. 1A. Using this calculation, at block 414, the device selects the extremal tag. After selecting the extremal tag, the method proceeds to block 418 as described above.

Returning to block 410, if no identified tags are moving, the method 400 proceeds to block 416. At block 416, the device selects the extremal tag, typically based directly on $f_1$ or $f_2$, or on another function of amplitude or phase (or both amplitude and phase) across different frequencies of operation, and proceeds to block 418 as described above.

Figure 10:
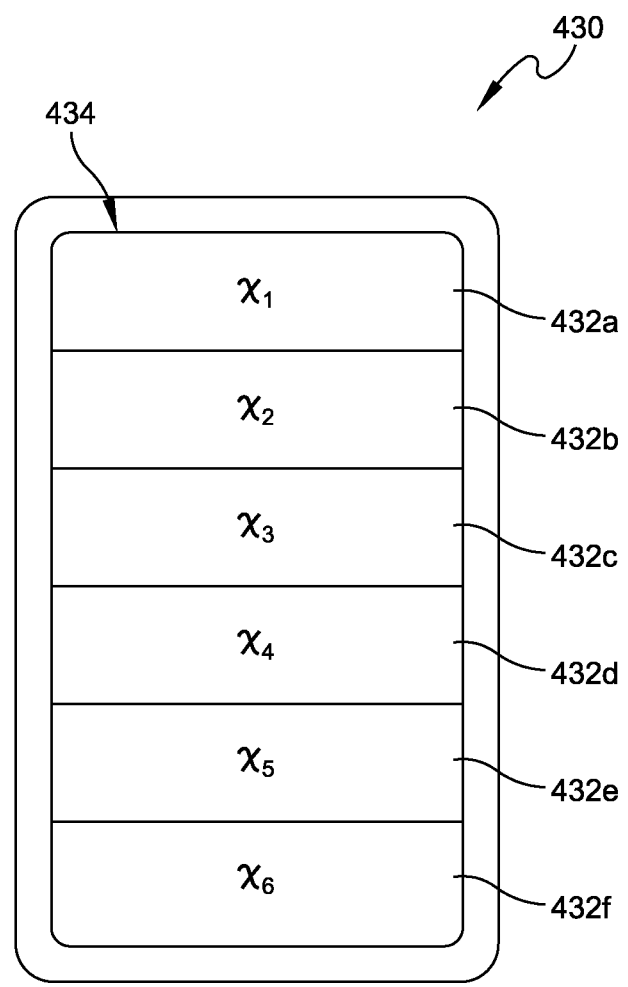
FIG. 10 is a diagram of a device displaying a sorted list with entries representing identified objects in accordance with aspects of the present invention.

FIG. 10 is a diagram of a device 430 displaying a sorted list 434 with entries 432a-432f representing identified objects $x_1$-$x_6$. The first entry 432a of the list represents the extremal tag, or the object the device 430 determined was most likely selected by the user. The other entries 432b-432e of the list represent other objects in the manipulatory space of the device and are ordered according to the likelihood that the particular object they represent is being selected. According to one feature, the list may include any selected number of entries corresponding to objects in the manipulatory space of the device 430, and a user may scroll down the display to see further entries.

Figure 11:
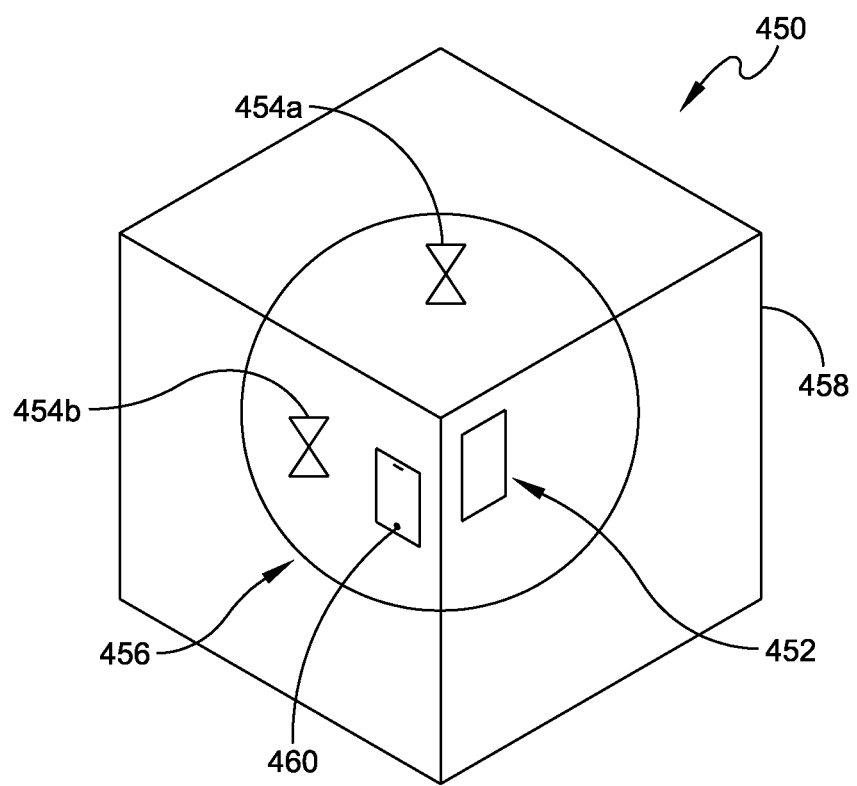
FIG. 11 is a diagram of a stationary reader and an area including identified objects accordance with aspects of the present invention.

FIG. 11 is a diagram 450 of a room 458 including a stationary reader 452 and an area 456 including identified objects 454a and 454b, and a wireless communication device 460, according to an embodiment of the invention. The area 456 is the radiofrequency field of view of the stationary reader 452. According to one aspect, the room 458 includes one or more users with wireless communication devices such as the wireless communication device 460. The wireless communication devices include tags, such that the reader 452 may identify each of the devices. The wireless communication device 460 may communicate with the stationary reader 452 to obtain a view of the objects within the readable space of the reader 452 (area 456), such as objects 454a and 454b. The stationary reader 452 may calculate algorithms for detecting moving objects and transmit this information to the wireless communication device 460. According to one feature, the wireless communication device 460 is in close proximity to the stationary reader 452 to obtain the information from the stationary reader 452. For example, the wireless communication device may be less than about one foot from the stationary reader, less than about two feet from the stationary reader, less than about three feet from the stationary reader, less than about one meter from the stationary reader, less than about two meters from the stationary reader, or between about one feet and about three feet from the stationary reader. According to one feature, obtaining information about objects in the area 456 from the reader 452 is useful when the wireless communication device 460 does not have sufficient output power to view the tags in the area 456. For example, the wireless communication device 460 may have a small battery or no battery, it may have an insufficient antenna system or size, or it may have other limitations, any of which may limit the wireless communication device's ability to view the tags in the area 456.

Figure 12:
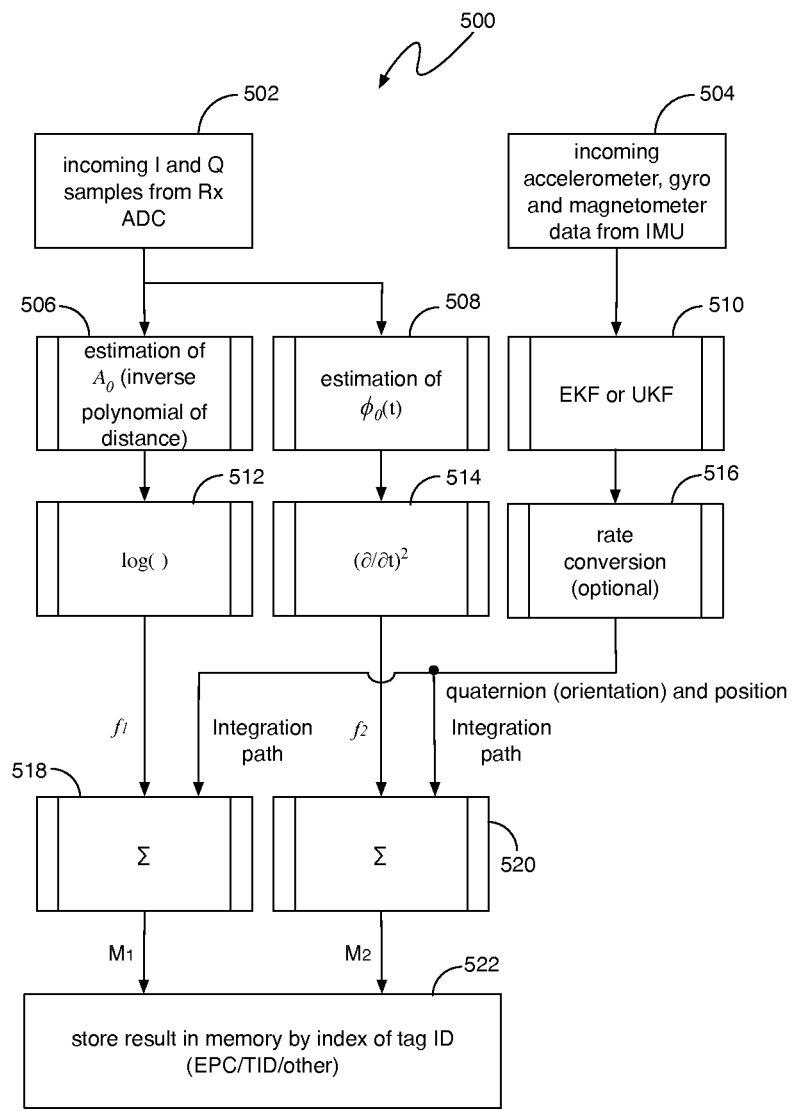
FIG. 12 is a flow chart of a method of estimating variables associated with identified tags of in accordance with aspects of the present invention.

FIG. 12 is a flow chart of a method 500 of estimating variables associated with identified tags, according to an embodiment of the invention. At block 502, the RFID reader receives a set of samples, including I&Q samples, as shown in FIG. 2. According to one embodiment, the reader continuously estimates the amplitude $A_0$ (block 506) and phase $\phi_0$ (block 508) from the I&Q baseband samples. At block 512, signal processing circuitry in the reader calculates the Log of the amplitude $A_0$ estimate resulting in $f_1$. Similarly, at block 514, signal processing circuitry in the reader calculates the derivative and square of the phase $\phi_0$ of the signals resulting in $f_2$. At block 518, the reader uses $f_1$ to calculate $M_1$, as described above with respect to FIG. 1A. For example, the reader may calculate $M_1$ by summing a time-series of $f_1$ calculations. In another example, the reader may calculate $M_1$ by weighting the sum of the time-series of $f_1$ by the path of the reader to calculate the integrals $M_1$. At block 520, the reader uses $f_2$ to calculate $M_2$, as described above with respect to FIG. 1.

According to some embodiments, the reader includes one or more inertial sensors, and at block 504, the reader processes one or more of incoming accelerometer, gyroscope, and magnetometer data from its inertial sensors. The incoming data from the inertial sensors is processed with an Extended Kalman Filter (EKF) or an Unscented Kalman Filter (UKF) or other algorithm at block 510. Optionally, the filtered data undergoes a rate conversion at block 516.

According to one embodiment, at block 518, the reader uses $f_1$ and the data from the inertial sensors to calculate $M_1$, as described above with respect to FIG. 1, According to another embodiment, at block 520, the reader uses $f_2$ and data from the inertial sensors to calculate $M_2$, as described above with respect to FIG. 1.

At block 522, the $M_1$ and $M_2$ functions are stored with the ID of the tag from which the incoming I & Q samples were received at block 502. The stored data may then be used to sort a list of tags or to execute actions at the reader, as described with respect to FIG. 9.

Figure 13:
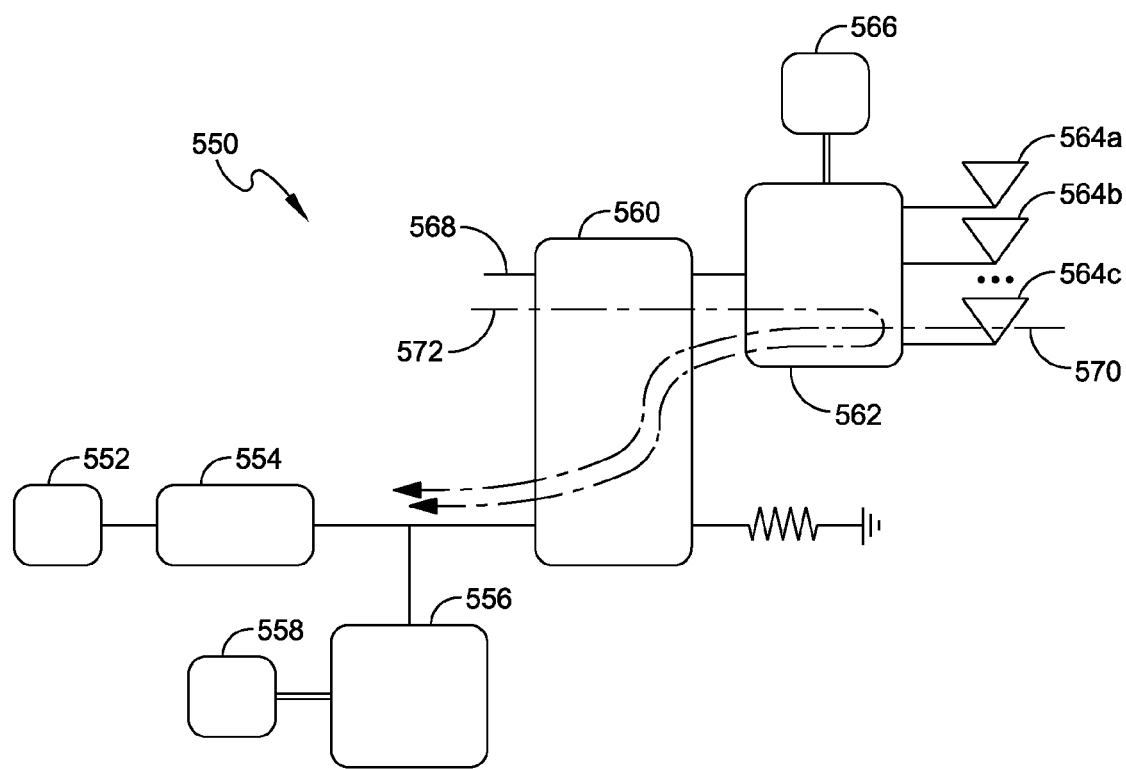
FIG. 13 is a schematic diagram of a base station showing the path of a transmitted signal to a receiver in accordance with aspects of the present invention.

FIG. 13 is a schematic diagram of a base station 550 that may be used in conjunction with a reader, object, or wireless communication device as discussed above. The base station 550 includes a baseband receiver, modem and microprocessor 552, a demodulator 554 including LO path and optional low noise amplifier, a power detector 556, a microprocessor 558, a coupler 560, a switch 562, antenna ports 564a-564c, and a digital control block 566. The diagram shows the path of a backscattered signal 570 from one or more wireless communication devices to the receiver 552. The power detector 556 is connected to the microprocessor 558, and monitors the RF power into the receiver level at the base station. In another embodiment, another power detector monitors the RF power level of the transmitted signal.

The coupler 560 is used to couple the transmitter and the receiver of the base station 500 to the antenna ports through the switch 560 under control of the digital control block. The coupler provides the backscatter RF signal to the receiver, which includes an optional low-noise amplifier, a demodulator, baseband receiver, modem and microprocessor 554, which demodulates the input RF signal to extract data from the signal, convert the data into digital information and store the information in a processor. The transmitter includes an analog baseband signal, which may come from a digital to analog converter and low pass filter, and a modulator (I&Q mixer) that creates an AM-modulated RF signal to be directed to a wireless communication device via an antenna.

As discussed above, embodiments of the present invention provide significant advantages in wireless communications devices by allowing the devices to identify other local devices or objects, and communicate with them without passwords or security codes.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of choosing an object from a plurality of objects using a wireless device, wherein each of the plurality of objects includes an RF interface configured to communicate using backscatter communication, the method comprising:
   receiving a backscatter communication signal from each of the plurality of objects;
   determining at least one analog parameter of each backscatter communication signal;
   detecting movement of the wireless device about at least a partially completed path about an object to be selected, the movement indicative of the object to be selected; and
   using the wireless device, selecting one object of the plurality of objects while the wireless device is moving with respect to the plurality of objects, based at least in part on the at least one analog parameter of each backscatter communication signal and based in part on the movement of the wireless device.

2. The method of claim 1, further comprising:
   generating an RF signal using the wireless device, and wherein receiving a backscatter communication signal from each of the plurality of objects includes receiving the backscatter communication signal from each of the plurality of objects by the wireless device.

3. The method of claim 2, further comprising displaying a list of identifiers for a subset of the plurality of objects on a display of the wireless device.

4. The method of claim 3, further comprising generating the list of identifiers based on the analog parameter of each of the plurality of signals.

5. The method of claim 4, wherein selecting one object includes receiving from a user of the wireless device an indication of a selection of a selected one of the plurality of objects from the list of identifiers.

6. The method of claim 5, further comprising after selecting one of the plurality of objects, communicating with the selected one of the plurality of objects using the wireless device.

7. The method of claim 1, wherein the at least one analog parameter is based on signal amplitude.

8. The method of claim 2, further comprising detecting movement of at least one of the plurality of objects, and determining at least one additional parameter for each moving object, and wherein selecting includes selecting one object of the plurality of objects based at least in part on the at least one analog parameter of each backscatter communication signal and based on the at least one additional parameter for each moving object.

9. The method of claim 1, wherein the at least one analog parameter is based on signal phase.

10. The method of claim 1, wherein the act of receiving includes receiving the backscatter signals at a stationary device, and wherein the method further includes forwarding information related to the backscatter signals from the stationary device to the wireless device.

11. A wireless mobile device used for choosing an object from a plurality of objects, the wireless device comprising:
   an RF interface configured to generate an RF signal and to receive backscatter signals related to the RF signal;
   a processing unit coupled to the RF interface and configured to:
   receive a plurality of backscatter signals from the plurality of objects;
   determine an analog parameter for each of the backscatter signals;
   detect motion of the wireless mobile device based on the backscatter signals
   wherein the motion is about at least a partially completed path about an object to be selected, the movement indicative of the object to be selected; and
   select a selected object from the plurality of objects while the wireless mobile device is moving with respect to the plurality of objects, based at least in part on the analog parameter for each of the backscatter signals and the motion of the wireless mobile device.

12. The wireless mobile device of claim 11, further comprising a display coupled to the processing unit, and wherein the processing unit is configured to generate on the display a list of identifiers for a subset of the plurality of objects on a display of the wireless device.

13. The wireless mobile device of claim 11, wherein the processing unit is further configured to generate the list of identifiers based on the analog parameter of each of the backscatter signals.

14. The wireless mobile device of claim 13, further comprising a user interface coupled to the processing unit, and wherein the processing unit is configured to select the selected object based on a signal from the user interface.

15. The wireless mobile device of claim 11, wherein the processing unit is further configured to communicate with the selected one of the plurality of objects through the RF interface after selecting the selected one of the plurality of objects.

16. The wireless mobile device of claim 11, wherein the at least one analog parameter is based on signal amplitude.

17. The wireless mobile device of claim 16, wherein the processing unit is further configured to detect movement of at least one of the plurality of objects based on the plurality of backscatter signals, and determine at least one additional parameter for each moving object, and wherein the processing unit is configured to select the selected object based at least in part on the at least one analog parameter of each backscatter communication signal and based on the at least one additional parameter for each moving object.

18. The wireless mobile device of claim 16, wherein the device is configured to operate as a cellular phone.

19. The wireless mobile device of claim 11, wherein the at least one analog parameter is based on signal phase.

20. A system comprising: a plurality of objects, each having an RF identification tag;
   a mobile device comprising an RF interface configured to generate an RF signal and to receive backscatter signals related to the RF signal from each of the plurality of objects and comprising at least one motion detector;
   a processing unit coupled to the RF interface and the at least one motion detector and configured to:
   receive a plurality of backscatter signals from the plurality of objects;
   receive at least one motion signal from the at least one motion detector;
   determine an analog parameter for each of the backscatter signals; and
   select a selected object, while the mobile device is moving with respect to the plurality of objects about at least a partially completed path about an object to be selected, the movement indicative of the object to be selected, from the plurality of objects based at least in part on the analog parameter for each of the backscatter signals and based at least in part on the at least one motion signal.

21. The system of claim 20, further comprising a display coupled to the processing unit, and wherein the processing unit is configured to generate on the display identifiers for a subset of the plurality of objects on a display of the wireless device.

22. The system of claim 21, wherein the processing unit is further configured to generate a list of the identifiers based on the analog parameter of each of the backscatter signals.

23. The system of claim 22, further comprising a user interface coupled to the processing unit, and wherein the processing unit is configured to select the selected object based on a signal from the user interface.

24. The system of claim 20, wherein the processing unit is further configured to communicate with the selected one of the plurality of objects through the RF interface after selecting the selected one of the plurality of objects.

25. The system of claim 20, wherein the at least one analog parameter is based on signal amplitude.

26. The system of claim 25, wherein the processing unit is further configured to detect movement of at least one of the plurality of objects based on the plurality of backscatter signals, and determine at least one additional parameter for each moving object, and wherein the processing unit is configured to select the selected object based at least in part on the at least one analog parameter of each backscatter communication signal and based on the at least one additional parameter for each moving object.

27. The system of claim 20, wherein the device is configured to operate as a cellular phone.

28. The system of claim 20, wherein the at least one analog parameter is based on signal phase.

* * * * *